Aug 5, 1941.  G. A. TINNERMAN  2,251,644
FASTENING DEVICE
Original Filed Dec. 22, 1938

INVENTOR.
GEORGE A. TINNERMAN
BY Bates, Teare, & M<sup>c</sup>Bean
ATTORNEYS

Patented Aug. 5, 1941

2,251,644

UNITED STATES PATENT OFFICE 2,251,644

FASTENING DEVICE

George A. Tinnerman, Cleveland, Ohio, assignor to Tinnerman Products, Inc., Cleveland, Ohio, a corporation of Ohio Original application December 22, 1938, Serial No. 247,158. Divided and this application July 5, 1940, Serial No. 344,101

2 Claims. (Cl. 24—73)

This invention relates to fastening devices and particularly to one which is adapted to be used in an assembly where it is necessary for the fastener to retain itself in article receiving position The present application is a division of my copending application, Serial No. 247,158, filed December 22, 1938, and that application is a continuation in part of my copending application, Serial No. 119,415, filed January 7, 1937, now Patent 2,222,449, granted November 19, 1940.

An important purpose of the present invention is the provision of means formed as an integral part of the nut for securing it to the structure with which it contacts in such manner that it is not only fixedly held in position, but that the perforation in the structure through which the device passes is closed or sealed by the securing means. Fasteners for accomplishing this purpose are useful for example in the assembly of an automobile body, parts of which are accessible from only one side, and wherein the opening through which the fastener is passed must be sealed to prevent the entrance of water and other foreign matter.

Additional uses for fasteners of this nature is in refrigerator cabinets where it is essential that the insulation carrying compartment be sealed against the entrance of moisture. Moreover, the invention finds utility in railway cars, airplanes, steel tanks, furnaces and associated types of products.

The invention finds particularly utility in holding conduits for oil, electricity or the like, because the conduits may be held in place merely by spring tension of the metal of which the fastener is made.

Figure 1:
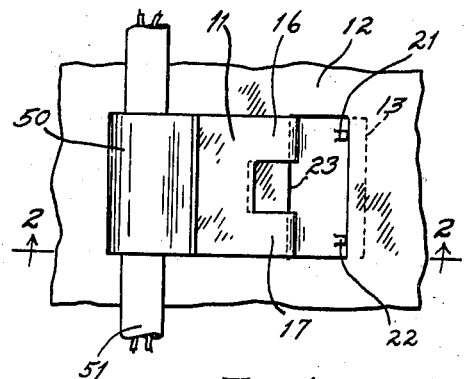
Figure 2:
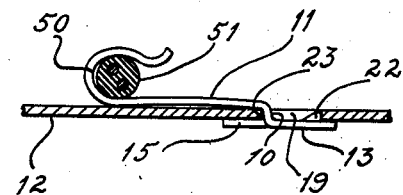

Referring now to the drawing, Fig. 1 is a top plan view of a fastener constructed in accordance with the present invention and showing the application thereof to a part to be joined, and Fig. 2 is a section taken on the line 2—2 in Fig. 1.

Referring to Figs. 1 and 2, the fastener comprises a strip of sheet metal that is offset intermediate its ends as at 10 to provide a nut carrying arm 11 that is disposed on one side of an article 12, and to provide another arm 13 that is adapted to engage the opposite side of the article 12. The arms 11 and 13 are disposed in approximately parallel planes.

To hold the fastener securely in place upon an article, I prefer to utilize a tongue 15 which lies substantially in the same plane as the arm 13 and which is formed from the arm 11 by being struck downwardly therefrom. The tongue is spaced from the arm sufficiently far to admit the article 12 and to make a snug fit therewith. The severing of the arm 11 to make the tongue 15 leaves a U-shaped opening in the arm and provides two tongues 16 and 17 adjacent the offset 10.

The article 12 is shown as having a fastener receiving aperture 19 therein, which serves as an opening through which the fastener may be passed until the tongue 15 engages the bottom of the article. At such time, the aperture is sealed by the arm 13 against the entrance of water or other foreign matter. Then, to lock the fastener in position on the plate, I have shown prongs 21 and 22 which are preferably struck upwardly from the arm 13 for engagement with the wall 20 of the aperture 19. The offset portion 10 engages the opposite wall 23 wherefore the fastener is securely locked in position on the article 12 with the tongue 15 and part of the arm underlying one surface thereof.

To assemble the fastener onto the article, the arm 11 is passed upwardly through the opening 19 and is then tilted until that portion of the article adjacent the wall 23 enters the crotch formed by the tongues 15, 16 and 17, and thereupon the fastener is forced forwardly until the prongs 21 and 22 snap into position against the wall 20.

To hold an article, such as a tube or cable 51, the arm 11 may be bent upwardly and backwardly to form a loop 50 which exerts a yielding pressure against the article for holding it firmly in place after it has been snapped into position upon the fastener. In practice, a number of fasteners may be inserted and locked into position upon a support and then the tube or cable 51 may be snapped into the fasteners and thereby held securely in the desired position. Inasmuch as the width of the arm 13 is substantially the same as the length of the opening 19, such opening is effectively sealed against the entrance of water.

From the foregoing description it will be apparent that a fastener made in accordance with the present invention may be made in a simple manner and may be effectively locked in place against the part with which it is intended to be attached.

Additionally, it will be apparent that the fastener may be used on exposed portions of an automobile body for holding a tube or conduit in place and for sealing the opening through which the fastener has been applied so as to prevent the entrance of water or extraneous matter into the body of the vehicle.

I claim:

1. A fastener for attaching an article to a structure having an opening therein, comprising a one-piece strip of sheet metal having one end thereof return-bent to provide an article receiving portion and having the other end offset to underlie said structure, said strip having a tongue deformed therefrom and lying in substantially the same plane as the offset portion and also underlying the structure, and said offset portion having means deformed therefrom for engaging the wall of the aperture, said means cooperating with the tongue to position the strip upon the structure.

2. A fastening device for positioning an article upon a structure having an aperture therein, said device comprising a strip of sheet metal having one end thereof bent upwardly to form a loop into which the article may be yieldably held, said strip having an offset portion adjacent the other end thereof, the offset portion having means deformed therefrom for engaging a wall of the aperture, said means comprising spaced prongs that extend out of the plane of the offset portion, and other means disposed in the plane of the offset portion for cooperating with the prongs to lock the fastener to the structure, said means including a tongue that underlies the structure adjacent the sides of the aperture opposite the side engaged by the prongs.

GEORGE A. TINNERMAN.